United States Patent
Höfler

(10) Patent No.: US 10,065,624 B2
(45) Date of Patent: Sep. 4, 2018

(54) METHOD FOR TRANSMITTING POWER OF AN INCH CLUTCH

(71) Applicant: ZF Friedrichshafen AG, Friedrichshafen (DE)

(72) Inventor: Hans Höfler, Immenstaad am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 182 days.

(21) Appl. No.: 15/206,431

(22) Filed: Jul. 11, 2016

(65) Prior Publication Data

US 2017/0015294 A1    Jan. 19, 2017

(30) Foreign Application Priority Data

Jul. 14, 2015    (DE) .......... 10 2015 213 151

(51) Int. Cl.
| | | |
|---|---|---|
| B60W 30/186 | (2012.01) | |
| B60W 30/18 | (2012.01) | |
| B60W 10/02 | (2006.01) | |
| F16D 48/06 | (2006.01) | |
| B60W 10/06 | (2006.01) | |

(52) U.S. Cl.
CPC .......... *B60W 10/026* (2013.01); *B60W 10/06* (2013.01); *F16D 48/06* (2013.01); *B60W 2300/17* (2013.01); *B60W 2510/0275* (2013.01); *B60W 2710/021* (2013.01); *B60W 2710/0644* (2013.01); *F16D 2500/1112* (2013.01); *F16D 2500/3051* (2013.01); *F16D 2500/3067* (2013.01); *F16D 2500/30415* (2013.01); *F16D 2500/30421* (2013.01); *F16D 2500/30426* (2013.01); *F16D 2500/7041* (2013.01); *F16D 2500/70454* (2013.01)

(58) Field of Classification Search
CPC .................. B60W 30/18063; B60W 30/186
See application file for complete search history.

(56) References Cited

U.S. PATENT DOCUMENTS

| | | | | |
|---|---|---|---|---|
| 5,613,581 A | * | 3/1997 | Fonkalsrud | ........... F16D 48/066 192/219 |
| 6,162,146 A | * | 12/2000 | Hoefling | ............... B60W 10/06 477/204 |
| 6,371,885 B1 | * | 4/2002 | Kobayashi | ............ B60W 10/02 477/115 |
| 6,647,332 B1 | * | 11/2003 | Esterby | ................. F16D 48/066 192/3.54 |
| 8,287,433 B2 | * | 10/2012 | Kishii | ............. B60W 30/18063 477/181 |
| 8,532,886 B1 | * | 9/2013 | Shirao | .................... E02F 9/2253 180/307 |

(Continued)

FOREIGN PATENT DOCUMENTS

| | | |
|---|---|---|
| DE | 10 2007 017 175 A1 | 10/2008 |
| DE | 10 2012 212 653 A1 | 1/2014 |

*Primary Examiner* — Tisha D Lewis
(74) *Attorney, Agent, or Firm* — Davis & Bujold PLLC; Michael J. Bujold

(57) ABSTRACT

A method of transmitting power of an inching clutch of a working machine, the power transmitted by the inching clutch is determined and the transmitted power exceeds a predefined inching clutch power, first the rotational speed of the drive engine is reduced and then the torque, that can be transmitted by the inching clutch, is reduced.

8 Claims, 1 Drawing Sheet

(56) References Cited

U.S. PATENT DOCUMENTS

2013/0006457 A1* 1/2013 Anders ................ E02F 9/2075
  701/22
2015/0019092 A1* 1/2015 Morimoto ............... F16D 48/06
  701/54

* cited by examiner

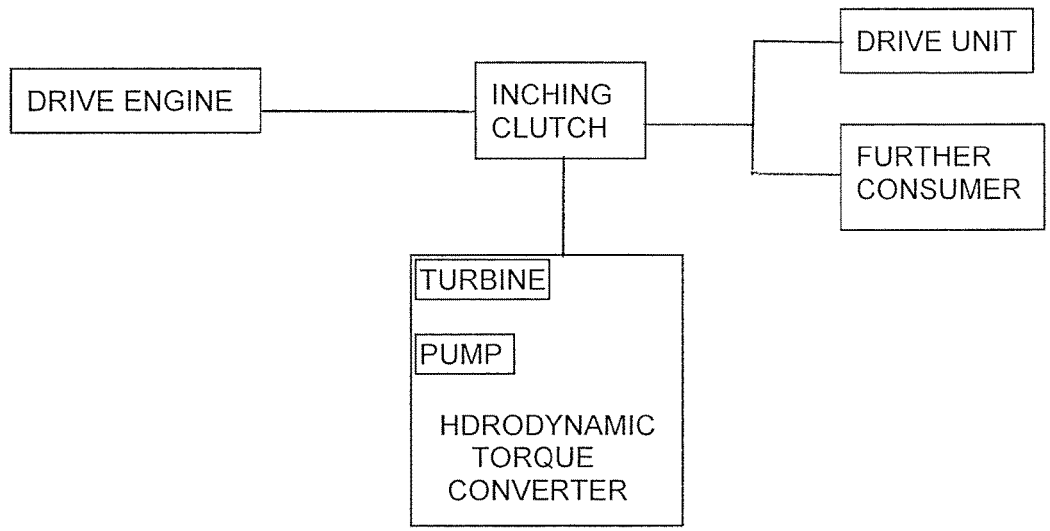

METHOD FOR TRANSMITTING POWER OF AN INCH CLUTCH

This application claims priority from German patent application serial no. 10 2015 213 151.3 filed Jul. 14, 2015.

FIELD OF THE INVENTION

The invention concerns a method for transmitting the power of an inching clutch.

BACKGROUND OF THE INVENTION

In vehicle drive units, particularly for working machines, that comprise a hydrostatically driven transmission, or in the case of a hydrostatically power-branched continuously variable powershift transmission, or in drive-trains with powershift transmissions having a hydrodynamic torque converter, or of electric drives, there is a so-termed inching function. For inching, by way of an additional brake pedal, the traction force of the drive unit is changed from 100% to 0%. In working machines the inching function is used in driving situations when a high engine rotational speed is needed for the hydraulic pump connected to an auxiliary power takeoff, but the travel speed has to be regulated to zero while the engine speed must remain high. Such driving situations, particularly in the case of wheel loaders, can be for example: inching on level ground when driving onto a truck while at the same time raising the scoop, inching on aggregate so that the full hydraulic power is available for filling and lifting the scoop, and inching while driving on a ramp where the scoop, for subsequent tipping, has to be raised already while driving.

The power that the inching clutch has to take up during inching depends on the one hand on the torque required and the drive engine rotational speed and the travel speed called for by the driver. In this slipping condition of the inching clutch the power at the inching clutch is a function of the rotational speed difference produced and the torque required. If the rotational speed difference or the torque required, and hence the power at the inching clutch are too high, the inching clutch can become overheated. The maximum possible rotational speed difference of the inching clutch occurs when the vehicle is stationary and the driver fully depresses the gas pedal. Thus, the level of the engine rotational speed depends on the engine characteristics. The level of the torque produced is as a rule limited by an applied maximum permissible torque. Thus, in any application, depending on the engine rotational speed a different maximum power is produced at the inching clutch. This can result in overstepping the maximum permissible power of the inching clutch.

DE 10 2007 017 175 A1 and DE 10 2012 212 653 A1 disclose methods for transmitting the power of an inching clutch.

DESCRIPTION OF THE DRAWING

The above discussed aspects of the present invention are illustrated in accompanying sole drawing which diagrammatically shows the components for practice of the invention.

DETAILED DESCRIPTION OF THE PREFERRED EMBODIMENTS

The purpose of the present invention is to further improve the method for transmitting the power of an inching clutch, particularly for working machines.

According to the invention, the power transmitted by the inching clutch is determined and, if a predetermined power is exceeded, the power transmitted by the inching clutch is limited. This limiting can be done by reducing the torque transmitted by the clutch. For example, this can be done if an electronic control unit limits the current emitted to the pressure regulator for controlling the torque, so that the pressure produced in the piston chamber of the disk clutch is limited.

To determine the torque produced at the inching clutch, in the case of a hydrodynamic torque converter the rotational speed of the pump impeller wheel and the rotational speed of the turbine wheel can be used. However, it is also possible to determine the torque in some other way, for example by means of torque sensors.

The power transmitted by the inching clutch is determined by the torque transmitted by the inching clutch and the rotational speed difference between a drive input shaft of the inching clutch and a drive output shaft of the inching clutch.

In another version of the invention, the predefined maximum permissible power value of the inching clutch is determined as a function of the flow of coolant medium that is flowing through the inching clutch. Since the quantity of the coolant medium flow depends on a rotational speed of the coolant medium pump, the coolant medium flow or the lubricant flow is calculated as a function of the rotational speed of the coolant medium pump.

In a further version of the invention, when the maximum permissible power of the inching clutch is reached the rotational speed of the drive engine is reduced, whereby the power transmitted by the inching clutch is also reduced. In the case of electronically regulated drive engines, the power limitation can also be combined with limiting the engine rotational speed. In other words, if the power at the inching clutch is too high at the maximum engine rotational speed, the engine speed is first reduced to a minimum desired engine speed during inching. If that is not sufficient, then in addition the torque at the inching clutch is reduced. To limit the power below that rotational speed of the drive engine, the torque at the inching clutch is reduced until the desired maximum permissible power has been reached.

By virtue of the method according to the invention, the inching clutch can be operated at the limit of its power.

The invention claimed is:

1. A method of transmitting power from a drive engine to a drive unit and a further consumer, the method comprising:
   transmitting the power to the drive unit by way of an inching clutch so that, depending on how the inching clutch is controlled, the power transmitted by the inching clutch is variable,
   determining the power transmitted by the inching clutch,
   if the power transmitted by the inching clutch exceeds a predefined power, limiting the power transmitted by the inching clutch,
   determining torque transmitted by the inching clutch from a rotational speed difference of a pump and a turbine of a hydrodynamic torque converter, and
   determining the power transmitted by the inching clutch from the torque and the rotational speed difference.

2. The method according to claim 1, further comprising limiting the power transmitted by the inching clutch by actuating the inching clutch farther in a disengaging direction thereby decreasing torque that is transmittable by the inching clutch.

3. The method according to claim 1, further comprising limiting the power transmitted by the inching clutch by reducing a rotational speed of the drive engine.

4. The method according to claim 1, further comprising limiting the power transmitted by the inching clutch as a function of a lubricant flow passing through the inching clutch.

5. The method according to claim 4, further comprising determining the lubricant flow from a rotational speed of a lubricant pump.

6. The method according to claim 1, further comprising limiting the power transmitted by the inching clutch by first reducing a rotational speed of the drive engine and then actuating the inching clutch farther in a disengaging direction.

7. A method of transmitting power from a drive engine to a drive unit and a further consumer, the method comprising:
transmitting the power to the drive unit by way of an inching clutch so that, depending on how the inching clutch is controlled, the power transmitted by the inching clutch is variable;
determining the power transmitted by the inching clutch;
if the power transmitted by the inching clutch exceeds a predefined power, limiting the power transmitted by the inching clutch, and limiting the power transmitted by the inching clutch by first reducing a rotational speed of the drive engine and then actuating the inching clutch farther in a disengaging direction; and
when the rotational speed of the drive engine is below a predefined drive engine rotational speed, actuating only the inching clutch farther in the disengaging direction and discontinuing the reduction of the rotational speed of the drive engine.

8. A method of transmitting power from a drive engine to a drive unit and a further consumer, the method comprising:
transmitting the power from the drive engine to the drive unit by way of an inching clutch;
determining torque transmitted by the inching clutch from a rotational speed difference of a pump and a turbine of a hydrodynamic torque converter;
determining the power transmitted by the inching clutch from the torque and the rotational speed difference;
comparing the power transmitted by the inching clutch to a predefined power of the inching clutch;
controlling the inching clutch so as to vary the power transmitted thereby, and
if the power transmitted by the inching clutch exceeds the predefined power of the inching clutch, limiting the power transmitted by the inching clutch.

\* \* \* \* \*